Patented Jan. 18, 1949

2,459,192

UNITED STATES PATENT OFFICE 2,459,192

CONCENTRATION OF BETA-PICOLINE

Kenneth H. Slagle, Mount Lebanon, and Robert S. Bowman, Pittsburgh, Pa., assignors to Jones & Laughlin Steel Corporation, Pittsburgh, Pa., a corporation of Pennsylvania No Drawing. Application January 7, 1947, Serial No. 720,676

5 Claims. (Cl. 260—290)

This invention relates to a process for concentrating beta or 3-picoline from a mixture of this substance and one or both of the related pyridine bases 4-picoline and 2,6-lutidine.

An object of our invention is to provide a process for at least doubling the concentration of 3-picoline in the mixture of pyridine bases known industrially as the "beta-gamma-picoline fraction." Another object is to provide a process for separating 3-picoline from 4-picoline.

The so-called "beta-gamma-picoline fraction," obtained from the fractional distillation of coal tar, or from coke oven gas, comprises the three pyridine bases boiling in the neighborhood of 144° C. These are beta- or 3-picoline, boiling at 144.0° C, gamma- or 4-picoline, boiling at 144.6° C., and 2,6-lutidine, boiling at 144.4° C. All three components are industrially useful, particularly 3-picoline, from which nicotinic acid or "niacin" can be made by a simple process. Because of the virtual coincidence of their boiling points, and the complete miscibility of all these isomers with water, alcohols, ketones and hydrocarbon solvents, they cannot be separated by conventional distillation or solvent extraction processes, or is it possible even to increase the concentration of the valuable 3-picoline by conventional methods.

We have invented a process for increasing the concentration of 3-picoline in the so-called "beta-gamma-picoline fraction," or alternatively, of fractionating a mixture of 3-picoline and 4-picoline. Our invention is based on the technique of fractional freezing, or crystallization.

The melting points of the pure pyridine bases are fairly well separated. Gamma- or 4-picoline melts at +3.8° C., 2,6-lutidine at −6° C., and beta- or 3-picoline at −18.3° C. It would appear that ths range is great enough to afford at least a partial separation of the constituents by fractional freezing, but this not, in fact, the case. All three constituents exhibit the phenomenon of undercooling to such an extent that when freezing finally starts the entire mixture solidifies in an amorphous mass. We have discovered, however, that the salicylates of these bases exhibit undercooling characteristics such that 3-picoline can be readily concentrated to a considerable degree by fractional freezing. Our process, then, comprises the addition of salicylic acid to the mixture of pyridine bases, controlled cooling to produce selective crystallization, filtering or centrifuging to separate solid and liquid phases, and finally, if desired, resolution of the salicylates into the original bases and salicylic acid.

When salicylic acid is added to a warm mixture of 3-picoline, 4-picoline and 2,6-lutidine and the solution slowly cooled, both 4-picoline and 2,6-lutidine salicylates crystallize simultaneously, leaving a liquid rich in 3-picoline salicylate, which may be separated from the solids by filtration or centrifuging.

The mixture of pyridine bases known industrially as the "beta-gamma-picoline fraction" is composed approximately of 37.5% 3-picoline, 37.5% 4-picoline and 25% 2,6-lutidine, but if it is treated by the process of our invention as herein described the concentration of 3-picoline, in the form of a salicylate, can be more than doubled in a single step. Further cooling of this concentrate will precipitate 3-picoline salicylate, but not in the form of pure crystals. This precipitate is about 85% 3-picoline salicylate, and this concentration is not materially increased by repeated precipitation.

If a substantially 2,6-lutidine-free mixture of 3-picoline and 4-picoline is treated by our process as herein described, crystals of 4-picoline salicylate begin to separate from the solution at about 25° C., and it is possible to produce 3-picoline salicylate having a purity of about 94%.

Our process as applied to ternary mixtures of the above mentioned pyridine bases is generally facilitated if to the raw material and salicylic acid is added a solvent, preferably a hydrocarbon solvent, such as toluene or iso-octane. The solvent apears to assist crystallization somewhat, and greatly reduces the viscosity of the liquid at low temperatures, thus lessening the difficulties of filtering or centrifuging the solids from the liquid. With binary mixtures of 3-picoline and 4-picoline the addition of a solvent appears to be somewhat detrimental to crystallization, and we prefer not to use a solvent if a reasonably complete fractionation of the mixture is required.

The actual process of our invention will now be described in more detail, both for binary and ternary mixtures. If it is desired to produce a 3-picoline concentrate from the "beta-gamma-picoline fraction" having the composition previously set out, salicylic acid is added to the mixture in quantity which is substantially the molecular equivalent of the bases. A suitable solvent, such as toluene, is also added, in quantity equivalent to about half that of the pyridine bases. The mixture is then cooled to about 0° C., during which cooling the 2,6-lutidine and 4-picoline salicylates crystallize. These solids are separated by filtering or centrifuging from the liquid, which may have a concentration of 3-picoline salicylate of about 85%.

A binary mixture of 3- and 4-picoline may be fractionated by adding salicylic acid, again in amount substantially the molecular equivalent of the bases. It is necessary here to warm the mixture before adding the acid, as 4-picoline salicylate begins to crystallize at about 25° C. These crystals are removed from the liquid by filtering or centrifuging. If it is desired to produce a 3-picoline of high purity, the liquid remaining after filtration may be cooled further, to about 10° C. In the course of this cooling an intermediate consisting of a mixture of 3-picoline and 4-picoline salicylates separates. These solids are also separated from the liquid by filtering or centrifuging, leaving a liquid which is substantially a 94% concentrate of 3-picoline salicylate.

In every case the pyridine base or bases may be recovered from the salicylates by dissolving them in water and treating with a caustic, such as sodium hydroxide, in quantity slightly greater than is stoichiometrically equivalent to the acid. The caustic breaks down the salicylate into the original bases, and for example, sodium salicylate. The pyridine base-water azeotrope is steam distilled from the solution, and dehydrated by refluxing with benzene. The pyridine bases are then separated from the benzene by fractional distillation.

The salicylic acid employed may also be regenerated from the salt formed in the foregoing operation. This is accomplished by adding a small excess of a strong mineral acid, such as sulfuric acid, to the salt solution, which displaces the salicylic acid from the salt. Because of its low solubility in water the salicylic acid separates and may be recovered by filtering or centrifuging.

The invention is not limited to the preferred embodiment but may be otherwise embodied or practiced within the scope of the following claims.

We claim:

1. The process of treating a liquid mixture of 3-picoline and at least one of the other pyridine bases 4-picoline and 2,6-lutidine which comprises adding salicylic acid, cooling the mixture to a temperature low enough to cause crystallization of the salicylates other than 3-picoline but to retain 3-picoline salicylate as a liquid, separating the solid salicylates from the liquid, and recovering the pyridine bases from their salicylates.

2. The process of treating a liquid mixture of the pyridine bases 3-picoline, 4-picoline and 2,6-lutidine, which comprises adding salicylic acid and a solvent, cooling to a temperature low enough to cause simultaneous crystallization of 4-picoline salicylate and 2,6-lutidine salicylate while retaining 3-picoline salicylate as a liquid, separating the solid salicylates from the liquid, and recovering the pyridine bases from their salicylates.

3. The process of treating a liquid mixture of the pyridine bases 3-picoline, 4-picoline, and 2,6-lutidine, which comprises adding salicylic acid and a hydrocarbon solvent, cooling to a temperature of about 0° C., whereby both 4-picoline salicylate and 2,6-lutidine salicylate are caused to crystallize, separating the solid salicylates from the liquid, and recovering the pyridine bases from their salicylates.

4. The process of treating a liquid mixture of the pyridine bases 3-picoline and 4-picoline, which comprises warming the mixture, adding salicylic acid, cooling the mixture to a temperature of about 25° C., whereby 4-picoline salicylate is caused to crystallize, separating the solid salicylate from the liquid, and recovering the pyridine bases from their salicylates.

5. The process of treating a liquid mixture of the pyridine bases 3-picoline and 4-picoline, which comprises warming the mixture, adding salicylic acid, cooling the mixture to a temperature low enough to cause 4-picoline salicylate to crystallize but to retain 3-picoline salicylate as a liquid, separating the solid salicylate from the liquid and recovering the pyridine bases from their salicylates.

KENNETH H. SLAGLE.
ROBERT S. BOWMAN.

REFERENCES CITED

The following references are of record in the file of this patent:

UNITED STATES PATENTS

| Number | Name | Date |
|---|---|---|
| 2,402,158 | Glowaki | June 18, 1946 |
| 2,432,063 | Cislak | Dec. 2, 1947 |
| 2,432,064 | Cislak | Dec. 2, 1947 |
| 2,432,065 | Cislak | Dec. 2, 1947 |

Certificate of Correction

Patent No. 2,459,192.  January 18, 1949.

KENNETH H. SLAGLE ET AL.

It is hereby certified that errors appear in the printed specification of the above numbered patent requiring correction as follows:

Column 1, line 40, for "ths" read *this*; line 42, for the words "but this not" read *but this is not*; column 2, line 34, for "apears" read *appears*;

and that the said Letters Patent should be read with these corrections therein that the same may conform to the record of the case in the Patent Office.

Signed and sealed this 17th day of May, A. D. 1949.

[SEAL]

THOMAS F. MURPHY,
*Assistant Commissioner of Patents.*